Sept. 4, 1934.　　　　R. L. DAVISON　　　　1,972,475
PARTITION CONNECTER
Filed Aug. 10, 1932　　　6 Sheets-Sheet 1

Fig.1.

INVENTOR
Robert L. Davison
BY
Henry J. Lucke
HIS ATTORNEY

Sept. 4, 1934.    R. L. DAVISON    1,972,475
PARTITION CONNECTER
Filed Aug. 10, 1932    6 Sheets-Sheet 2

INVENTOR
Robert L. Davison
BY
HIS ATTORNEY

Sept. 4, 1934.   R. L. DAVISON   1,972,475
PARTITION CONNECTER
Filed Aug. 10, 1932   6 Sheets-Sheet 3

INVENTOR
Robert L. Davison
BY
HIS ATTORNEY

Sept. 4, 1934.　　　　R. L. DAVISON　　　　1,972,475
PARTITION CONNECTER
Filed Aug. 10, 1932　　　　6 Sheets-Sheet 4

INVENTOR
Robert L. Davison
BY
HIS ATTORNEY

Sept. 4, 1934.   R. L. DAVISON   1,972,475
PARTITION CONNECTER
Filed Aug. 10, 1932   6 Sheets-Sheet 5

INVENTOR
Robert L. Davison
BY
HIS ATTORNEY

Sept. 4, 1934.   R. L. DAVISON   1,972,475
PARTITION CONNECTER
Filed Aug. 10, 1932   6 Sheets-Sheet 6

INVENTOR
Robert L. Davison
BY
HIS ATTORNEY

Patented Sept. 4, 1934

1,972,475

UNITED STATES PATENT OFFICE 1,972,475

PARTITION CONNECTER

Robert L. Davison, New York, N. Y., assignor to John B. Pierce Foundation, New York, N. Y., a corporation of New York Application August 10, 1932, Serial No. 628,170

12 Claims. (Cl. 72—46)

My present invention relates to building construction and more particularly to an improved method of attaching or connecting partition panel sections to each other or to the side or any wall of a building, and to an improved connecting device for permitting such connection of the panel sections to each other and to the side or end walls.

In my co-pending application Ser. #591,395, filed February 6, 1932, entitled Factory fabricated partition and ceiling construction, I have described and claimed improved forms of partition panels which make it possible to erect partitions in a building at a minimum cost and in a minimum of time, and in erecting such partitions, it is necessary to be able to connect the partitions to the side walls or end walls of the building and also to connect the partitions to partitions, and in such case one or more of the partitions acts for all practical purposes as a side wall or walls of a building.

In my present invention I have developed a new and improved method of attaching partition panel sections to each other and to the side or end walls of a building whereby it is possible to erect a partition at any point in the building and at any position along the side or end walls, and further, my improved method of construction enables me to not only erect a partition at any point within a building structure, but to connect the ends of such partition to a partition and at any point along the side of a partition wall section or at the joining point of two wall sections, and further, permits me to connect the end of a partition panel to the end of a partition where such end of the partition ends at any other point than at a side or end wall of a building.

Also, in my present invention I have devised improved forms of connecters for connecting partition sections to each other end to end, or to each other at any point along the side of one of such partitions and to connect the partitions to a wall of a building at any point along the length thereof, and while in general my connecter is of one particular form, yet it embodies various modifications in order to take care of all special cases which may arise in placing partitions within a building.

The principal object of my invention therefore is an improved connecter for connecting partition sections to each other end to end.

Another object of my invention is an improved form of connecter for connecting a partition section at its end to the face wall of another partition section.

Still another object of my invention is an improved method of erecting and constructing partitions for houses and the like out of a plurality of partition panel sections.

An object of my invention is an improved building element comprising a partition connecting means incorporated in an outer building wall.

Other objects and novel features of the construction and arrangement of parts comprising my device will appear as the description of the invention progresses.

In the accompanying drawings.

Figure 1:
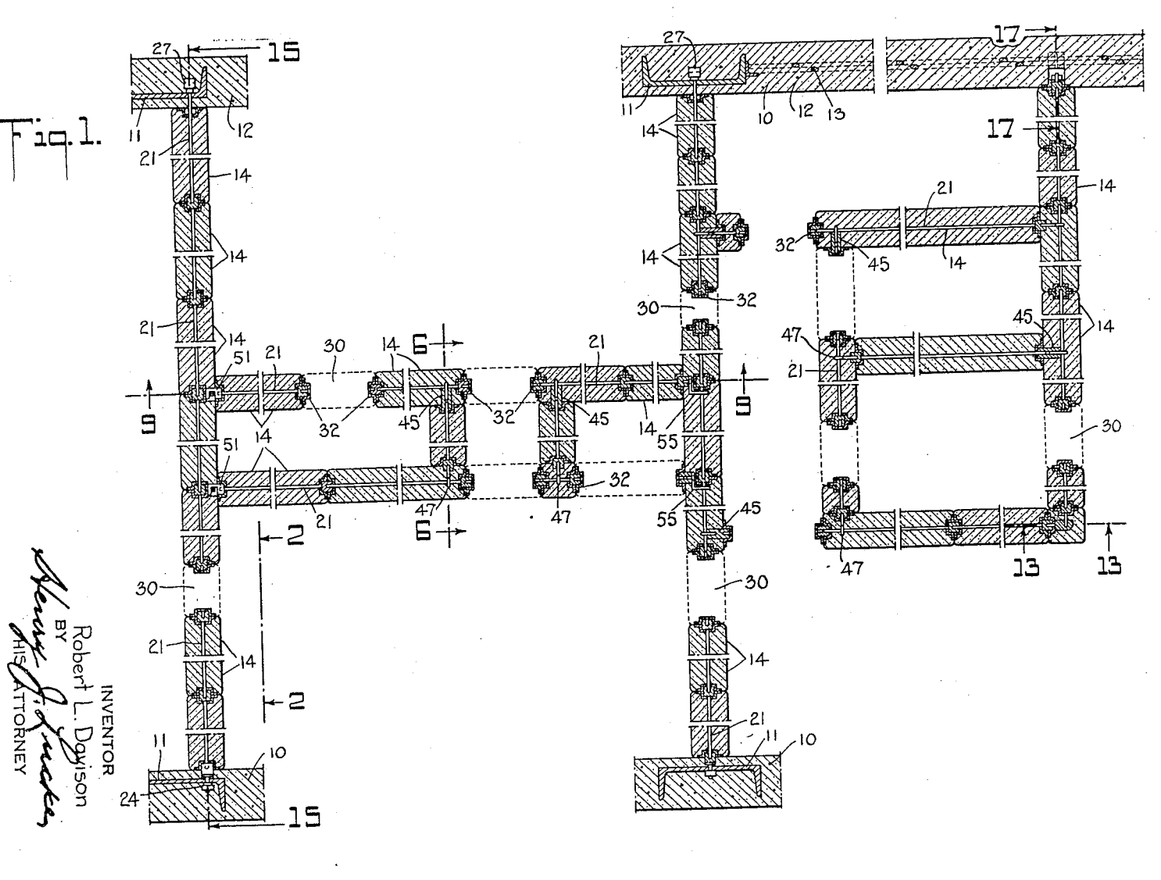
Fig. 1 is a sectional plan view showing various examples of connecting wall partitions to each other end to end, and to the side walls of a building, as well as connecting the end of a wall partition to the side or face wall of another partition.

Referring to the drawings and particularly to Fig. 1, there is shown a portion of a typical floor plan of a house or other structure in which the outer walls 10 are constructed of vertically arranged channel members 11 spaced at intervals and embedded in concrete or other material 12, and if of concrete, such concrete may be reenforced by means of diagonal frame members 13, or in any other suitable manner.

To the left of Fig. 1 is shown a partition composed of a plurality of partition panels 14, such as are described and claimed in my aforesaid co-pending application, and likewise in the center of such Fig. 1 are shown panels 14 constituting a second partition. Further, at the extreme right of Fig. 1 is shown another partition composed of panels 14 all constructed and arranged as set forth in my co-pending application above referred to.

Where a partition, as for example the partition at the extreme left and at the center of Fig. 1, comprised of a plurality of partition panels 14 extended between opposite outside walls 10 and at a vertical riser 11, the problem of attaching the partition panels 14 is relatively simple.

Figure 15:
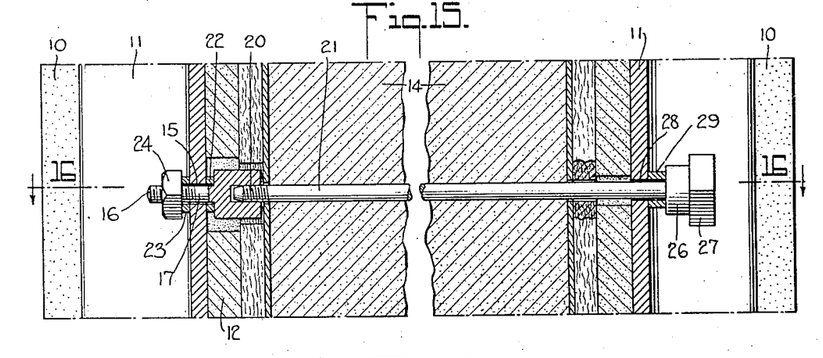
Fig. 15 is a sectional elevation on the line 15—15 of Fig. 1 on an enlarged scale, certain parts being omitted for the sake of clearness of illustration.

The preferred method is illustrated in Fig. 15, and referring to such figure, 10 designates the outside wall, 11 the vertical riser, and it will be noted that the vertical riser is drilled or otherwise perforated as indicated at 15 to allow the passage of the threaded end 16 of a bolt 17 that is formed integral with a member having a squared or otherwise non-cylindrical or multi-sided portion 18 adjacent to the bolt 17 and a cylindrical member 19 as an extension of the non-cylindrical or multi-sided member 18. The combined members 18 and 19 are drilled and tapped to receive the threaded end 20 of a tie rod 21.

In erecting a partition to be attached to the vertical riser 11, a portion of the concrete or other material 12 is broken away, as indicated at 22, to provide a space in which may be inset the non-circular portion 18, above referred to. A washer 22a of any suitable material is slipped over the bolt 17, the bolt 17 then passed through the perforation 15, and a washer 23 is slipped over the threaded end 16 of the bolt, after which a nut 24 is screwed onto the threaded end 16 to securely fasten the members 18 and 19 in position. The dimensions of the washer 22a and the members 18 and 19 are such that when the assembly is in position, as will be apparent from an inspection of Fig. 16, the cylindrical portion 19 extends outward beyond the inner end of the wall material 12.

The first partition panel 14 is then placed in position and such panel 14 has as an integral part thereof a channel member 25 in which the cylindrical portion 19 is housed. The channel member 25, as will be apparent from my co-pending application above referred to, extends throughout the length of the panel 14 and one of such channel members 25 is arranged at each vertical end or edge of such panel.

Extending transversely through the panel 14 and at appropriate distances along the length or height thereof are the tie rods 21 threaded as above described on the ends 20, and the bolts 17 are positioned so as to be in alignment with such tie rods 21. The tie rods 21 then have their threaded ends 20 screwed into a drilled and tapped hole in the members 18 and 19, as clearly shown in Fig. 15, and formed integral with the tie rods 21 and at the end thereof opposite the threaded ends 20 are heads composed of a cylindrical portion 26 and a squared or other non-cylindrical or multi-sided portion 27, the cylindrical portion 26 fitting into the channel member 25 at the end or edge of the panel 14 opposite the end or edge above referred to as being placed against the outer wall 10. The non-cylindrical or multi-sided portion 27 extends outward beyond the end face of the panel 14 and the tie rods 21 are screwed into position in the members 18 and 19 sufficiently to rigidly attach the panel 14 to the outer wall 10 and also the non-cylindrical or multi-sided portions 27 are arranged to register with the next succeeding channel member 25 on the next succeeding partition panel 14 to form the partition being constructed.

Figure 16:
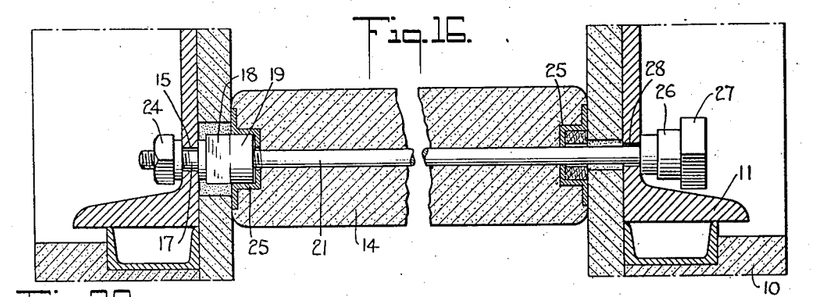
Fig. 16 is a sectional plan view on the line 16—16 of Fig. 15.
Figure 17:
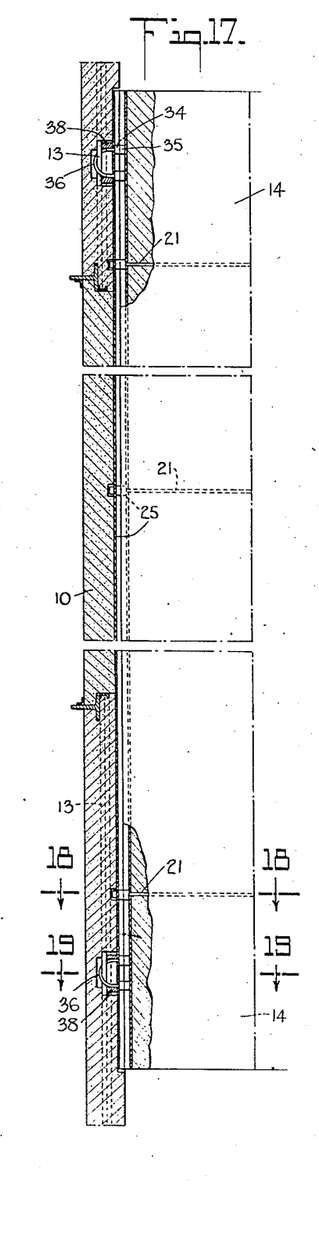
Fig. 17 is a sectional elevation on the line 17—17 of Fig. 1.
Figure 18:
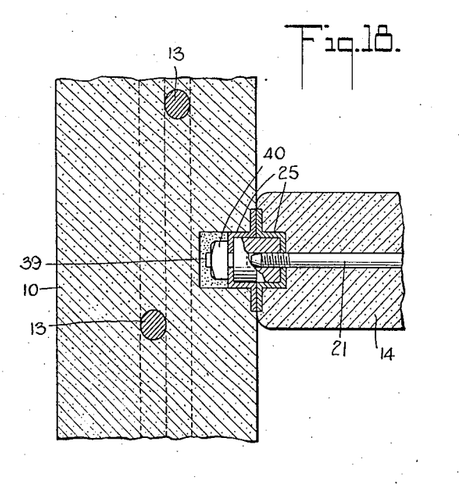
Fig. 18 is a sectional plan view on the line 18—18 of Fig. 17.
Figure 19:
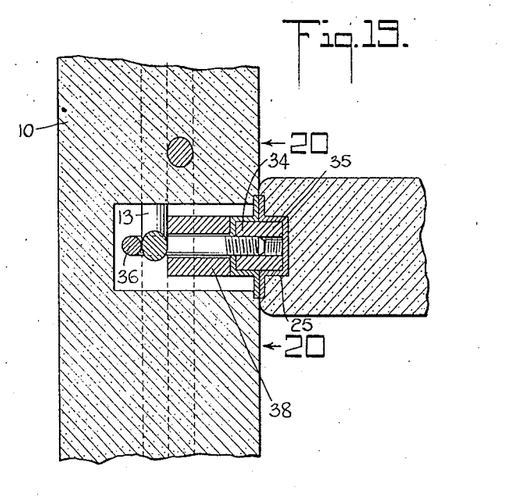
Fig. 19 is a sectional plan view on the line 19—19 of Fig. 17.
Figure 20:
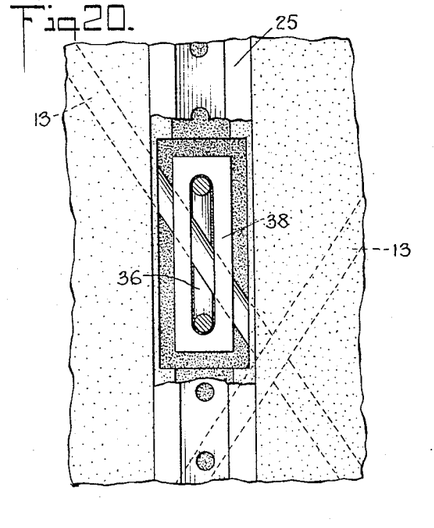
Fig. 20 is an elevation on the line 20—20 of Fig. 19.
Figure 21:
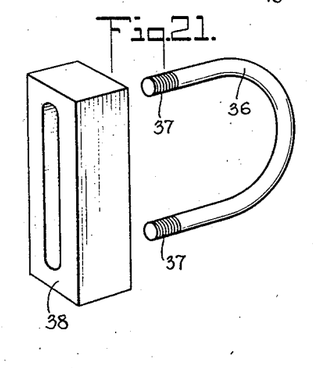
Fig. 21 is a perspective view of the connecting device shown in Figs. 17, 19 and 20.

The method above described is continued by adding panels 14 until the opposite wall 10 is reached, when it will be obvious that a relatively long tie rod or rods 21 is or are employed when the vertical riser 11 of such wall is drilled, as indicated at 28, to allow the passage of the tie rod and a washer 29 is employed under the cylindrical portion 26 or between such circular portion and the inner portion of the channel member 11, and the partition is thus completed by screwing the last tie rod into position, as indicated at the right hand ends of Figs. 15 and 16.

Figure 2:
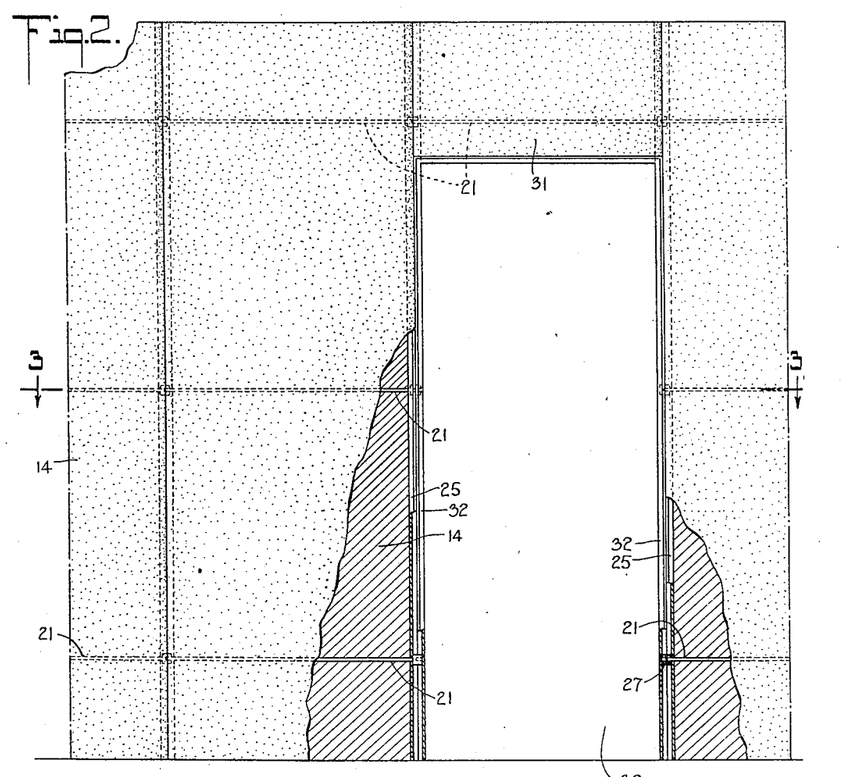
Fig. 2 is an elevation in view on the line 2—2 of Fig. 1.
Figures 3, 4, 5:
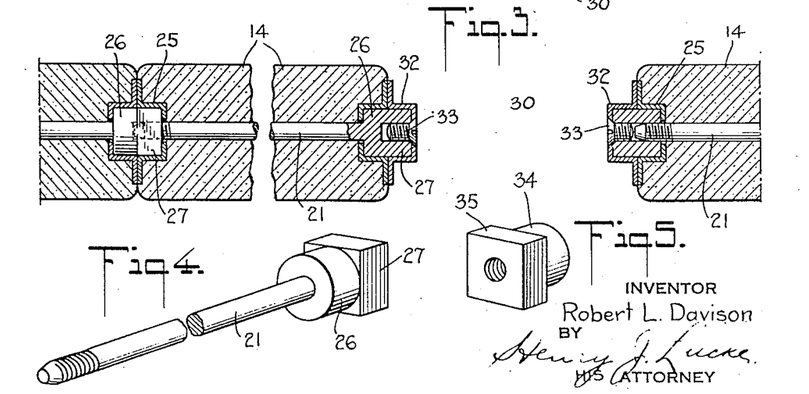
Fig. 3 is a sectional plan view on the line 3—3 of Fig. 2.
Figs. 4 and 5 are perspective views of the partition connecting elements employed in Figs. 2 and 3.

In constructing such partition or a similar partition, it may be necessary or desirable to provide a space for a doorway, for example as is indicated by the reference numeral 30 in Figs. 1, 2 and 3, and in providing for such doorway, a partial length partition member 31 is employed through which a tie rod 21 is passed and thus ordinarily leaving a plurality of non-cylindrical or multi-sided portions 27 of the tie rods exposed in the doorway proper. To provide a finish for such exposed members and also to provide the necessary material on which to hang doors, hinges, etc., I have provided separate channel members 32 similar in dimensions to the channel members 25, above referred to, and such channel members are placed in position on the non-cylindrical or multi-sided portions 27 and are retained in position by the flat head screws 33, as clearly shown in Fig. 3.

Also, in starting the lowermost tie rods to the right of the doorway, I utilize the member shown in Fig. 5, where the cylindrical portion 34 is placed in the channel member 25 in the partition 14 to the right of the doorway 30, as viewed in Figs. 2 and 3, and formed integral with such cylindrical portions 34 is the non-cylindrical or multi-sided portion 35 which is brought into vertical alignment with the channels 25. When thus positioned, the tie rods employed in the panels to the right of the doorway 30 engage a threaded hole through the members 34 and 35 and as a finish piece on this right hand side of the doorway 30, I place the channel member 32 and hold the same on there by flat head screws 33, as in the case of the left hand side of such door.

The erection of a partition composed of a plurality of partition panels 14 between outer walls 10 where the partition terminates opposite the vertical risers 11, is thus a comparatively simple matter and which may be readily understood from the above description.

It often times happens, however, that it is necessary to erect a partition at some point along one of the outer walls 10 at a point where no vertical riser 11 exists and for this purpose I find it desirable to utilize the reenforcing member 13 above described as being composed of diagonal metal members. Such a partition is shown at the extreme end of Fig. 1 and the method of attaching such partition is also illustrated in relatively enlarged form in Figs. 17, 18, 19, 20 and 21.

In carrying out this aspect of my invention, I find it preferable to provide a vertical groove on the inner face of the outer wall 10 at the point where the partition to be erected is to be located and expose the diagonal wires forming the reenforce 13.

At a plurality of points along the vertical groove thus formed in the inner face of the outer wall 10, it will be found that the reenforcing rods 13 are exposed and at several points, usually two, I attach to the diagonal reenforce rods 13 a U-shaped member 36, the legs of which at their ends are threaded as indicated at 37. Over the protruding threaded ends 37 I slip a grooved spacing block 38 against which will rest a channel member 25, as clearly shown in Fig. 19 and the threaded ends 37 will pass through perforations formed in the channel member 25. Over the threaded ends 37 is screwed one of the members 34, 35 illustrated in Fig. 5, the cylindrical portion 34 lying within the channel member 25 and the square or other non-cylindrical or multi-sided portion 35 lying without the outer surface or face of the channel member 25 and in alignment so as to be ultimately positioned in the channel member 25 formed or positioned in a vertical edge of a panel 14.

Before the channel member 25 is finally positioned in the vertical groove formed in the inner face of the outer wall 10, members 34, 35 are positioned along the length thereof in the following manner. Screwed into the cylindrical portion 34 is a stud 39 which passes through a perforation formed in the channel member 25 and in horizontal alignment with the tie rods 21, and on such stud 39 is screwed a nut 40 which securely holds the members 34, 35 in position and with the non-cylindrical or multi-sided portion 35 in vertical alignment with the channel member 25 in the edge of the partition panel 14 that is to be attached to the outer wall 10. The partition composed of a plurality of panels 14 is then attached to the outer wall 10 as in the manner above described with respect to the partition attached to the vertical riser 11.

Figure 6:
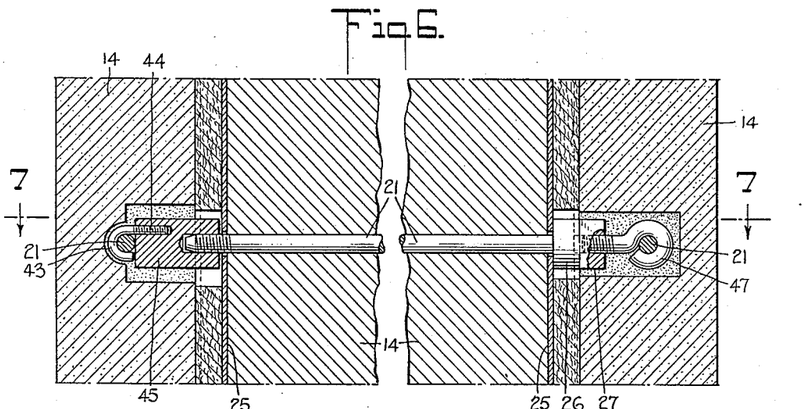
Fig. 6 is a sectional elevation on the line 6—6 of Fig. 1.
Figure 7:
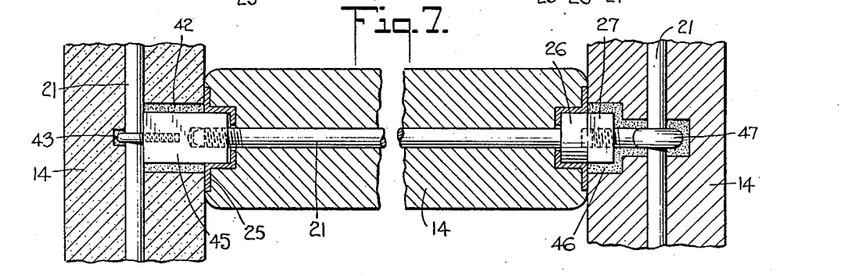
Fig. 7 is a sectional plan view on the line 7—7 of Fig. 6.
Figure 8:
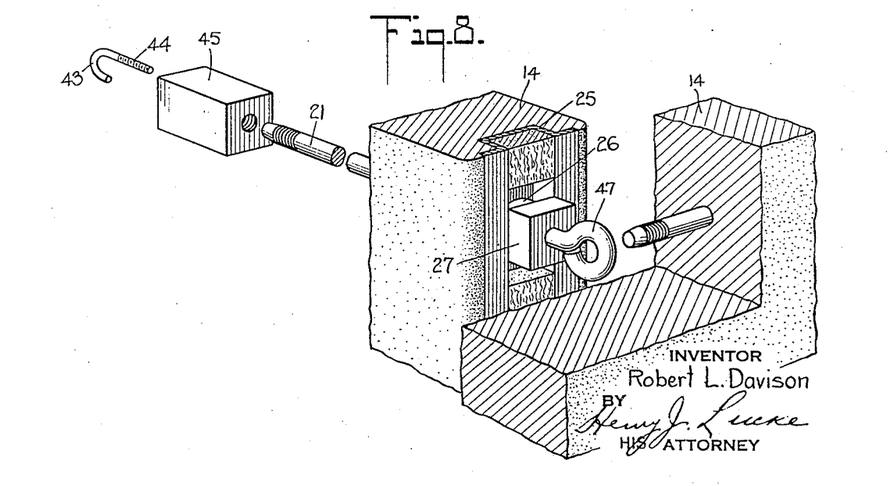
Fig. 8 is a perspective view in section and in elevation showing the type of connecting element employed and the method of using the same.

Referring again to Fig. 1, there is shown a panel 41 which is not attached to either of the outer walls 10 but which necessarily, as in partitioning a floor space, is attached to a partition. The means and method of attaching a partition to a partition is illustrated in Figs. 6, 7 and 8, and referring to such figures, there is shown for example a partition panel 14 to which it is desired to attach a partition panel 14 and the latter panel 14 extends outward at right angles or substantially right angles from the first named panel 14. In these figures the tie rods 21 in the first named panels are illustrated and in attaching the partition to the partition panels containing the tie rods 21, such panels 14 are cut away as indicated at 42 at points in a vertical line opposite the tie rods 21 and at this point the following method of attachment is preferably employed.

A hook member 43 partially encircles the tie rod 21 and the threaded leg 44 of the hook member 43 is screwed into a threaded hole in a spacing block 45 of suitable material and which is preferably non-cylindrical or multi-sided in shape. The block 45 may preferably be screwed onto the threads 44 and in this way the block 45 is securely positioned on the tie rod 21 and with a portion of the block 45 extending outward beyond the face of the partition 14 and with such blocks 45 in vertical alignment so as to be received in the channel member 25 located in the edge of the partition 14 to be located at substantially right angles to the first said partition 14. The block 45 is also drilled and tapped to receive the threaded end of a tie rod 21, such tie rod, as has been above described, being provided with the cylindrical portion 26 and the non-cylindrical or multi-sided portion 27, all as illustrated clearly in Fig. 4. The tie rods 21 are therefore extended through the partition panel 14 and screwed into the threaded hole in the blocks 45, thus securely positioning the panel 14 with respect to the first said panel 14, as clearly shown in Figs. 6 and 7.

In the partition as so far constructed, the tie rods 21 are in position and with the non-cylindrical or multi-sided heads 27 of the tie rods 21 extending outward beyond the edge of the attached panel 14 and with such heads in alignment. The position the attached panel or panels 14 are to occupy with respect to a partition formed of panels 14 is now determined and a vertical groove formed in the appropriate panel 14 of the second partition, such groove being designated by the numeral 46 in Figs. 6 and 7. Such grooves 46 are extended inwardly at points to expose the tie rods 21, as clearly shown in Figs. 6 and 7, and before the middle panel 14, shown in Figs. 6 and 7, is attached to the right hand panel shown in such figure, there is screwed into the threaded opening in the non-cylindrical or multi-sided portion 27 an eye member 47 and the eye in such member is arranged in a vertical plane, that is, with the axis of the eye in a horizontal plane. When thus positioned, the eyes 47 and the non-cylindrical or multi-sided portions 27 are housed within the vertical groove 46 and afterwards the tie rods 21 in the right hand panel 14 are inserted through the eyes 47 and thus tie the complete partition to be erected between the left and right hand panel members 14, as viewed in Fig. 7, securely in position. In connection with the description of the erection of this panel, the form of connecters and the method of employment of such connecters is clearly illustrated in the isometric in Fig. 7.

The above immediately preceding paragraphs have been directed to describe the type of connecter used where it is desired to extend a partition between two partitions at a point between the ends or edges of panels 14, as for example in the position shown in the section line 6—6 of Fig. 1. It may happen, however, that it is necessary to extend a partition between two existing partitions and at a point where two panels 14 meet, as for example, it may be desired to connect a partition between the left hand partition shown in Fig. 1 and the central partition shown in such figure, or along the line illustrated by the section line 9—9 of Fig. 1. When this condition arises, a particular form of connecter must be employed, such as illustrated for example in Figs. 9, 10, 11 and 12, and referring to such figures, the two partition panels 14, illustrated at the left of Fig. 10 for example, are joined as is usual by the tie rods 21 in the manner heretofore described, and the cylindrical and non-cylindrical or multi-sided portions 26 and 27 of one of such tie rods are therefore housed within the abutting faces of the channel members 25.

Figure 9:
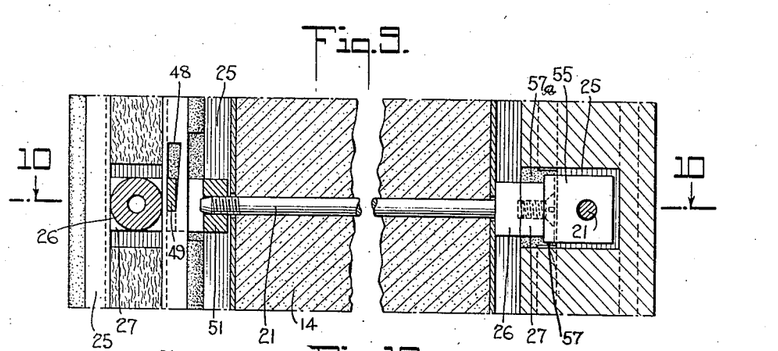
Fig. 9 is a sectional elevation on the line 9—9 of Fig. 1, parts being broken away and omitted for clearance of illustration.
Figure 11:
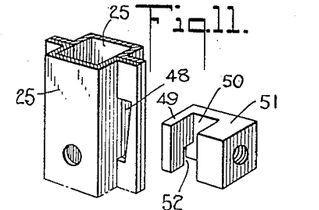
Fig. 11 is a perspective view of the connecting device employed at the left of Figs. 9 and 10.

Special channel members 25 to allow a partition panel to be connected thereto may be employed or it may be preferable and it is always possible to cut out of the abutting edges of the contacting channel members 25 aligned vertical grooves 48, as illustrated clearly in Figs. 9 and 11.

Cooperating with the aligned grooves 48 is a plate 49 formed by cutting a vertical groove 50 in a block 51 of suitable material, the plate 49 being cut away as indicated at 52 to provide a means for securely locking the block 51 to the abutting channel members 25. It is understood of course that the adjacent partition panels 14 are cut away as indicated at 53 to allow the block 51 to be moved into connecting position with the channel members 25. Also, it will be obvious that the aligned grooves 48 are longer than the height of the block 51 or of the plate 49 formed as an integral part thereof.

Also, the aligned grooves 48 are preferably tapered with the largest portion at the top in order that the member 49 may be wedged into locking position with respect to the channel members 25 when in final and operative position. It will be obvious also that to place the block 51 in position, the plate 49 thereof is moved laterally through the aligned grooves 48 and then moved downwardly until the notch 52 engages with the material of the flanges of the channel members 25, as clearly shown in Fig. 9. When thus positioned, the outer end of the block 51, which is non-cylindrical or multi-sided and preferably square in form, extends outwardly beyond the faces of the adjacent partition panels 14 and in position to be housed within the channel member 25 formed in or secured to the left vertical edge of the central partition panel 14, shown in Figs. 9 and 10. The central partition panel 14 is now secured to the blocks 51 by threading tie rods 21 into a threaded hole in the block 51, as clearly shown in Figs. 9 and 10, the threaded hole in the block 51 being clearly shown in Fig. 11.

Figure 10:
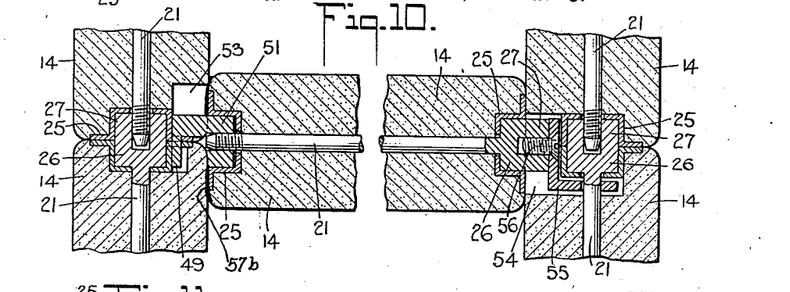
Fig. 10 is a sectional plan view on line 10—10 of Fig. 9.

The partition to be erected, of which the middle partition panel 14 shown in Figs. 9 and 10 may be the sole member or merely one of a plurality of members, is now built up in the usual way and as described heretofore until the middle partition, for example shown in Fig. 1, is reached and which is indicated by the two abutting partition panels 14 to the right of Figs. 9 and 10. The abutting edges of the right hand partition shown in Figs. 9 and 10 are now cut away to provide a vertical groove 54 to house not only the non-cylindrical or multi-sided portions 27 of the tie rods 21 on the partition panels 14, shown in the center of Figs. 9 and 10, but also to house an angle bracket member 55, each of which is secured by flat head screw 56 to the threaded hole in the non-cylindrical or multi-sided portion 27 of the tie rods 21.

Also, it is usually necessary to cut away the adjoining flanges of the channel members 25, as indicated at 57 in Fig. 9, in order to allow the non-circular portion 27 of the tie rods 21 and one arm of the bracket 55 to move into proper position with relation to the tie rods 21 that are to extend through the right hand partition panels 14.

It will be obvious, of course, that the arm of the bracket 55 extending outward from the middle partition panel 14 is provided with a hole 58 which is in alignment with the passage in the lowermost partition panel 14 to the right of Fig. 10 to allow the tie rod 21 to be inserted therethrough and when in proper position, it is obvious that the middle partition is securely locked to the lowermost partition panel 14 to the right of Fig. 10 and after such locking operation has taken place, the remaining partition panels 14 of the middle partition, shown in Fig. 1 and above the section line 9—9 of such figure, are added to complete the middle partition.

The above types of connecters are ordinarily sufficient to take care of the problems which arise in connecting or erecting partitions between the outer walls of a building or between panels already erected or to be erected and which do not necessarily extend between the outer walls and but one other case arises where a particular type of connecter is necessary. This is the case where it is desired to connect two partitions at their meeting point and in such case not only is a particular type of connecter necessary, but also a particular type of corner partition bar or fragmentary panel. Such is the case where it is desired to connect, for example, what may be termed the free or loose end of the right hand panel shown in Fig. 1 with a panel extending at right angles thereto, and at the free or loose end above referred to. This is indicated in Fig. 1 by the section line 13—13 and which specifically refers to the detail construction shown more clearly and in enlarged form in Figs. 13 and 14.

Figures 12, 13:
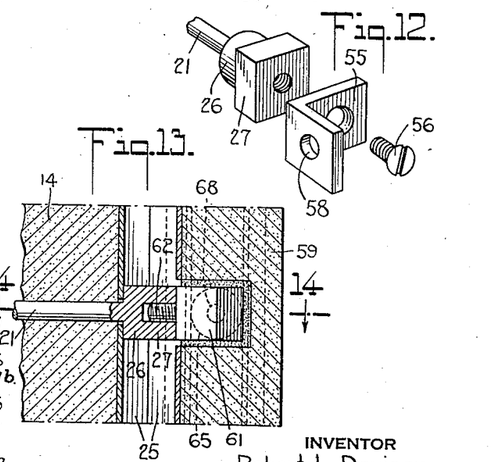
Fig. 12 is a perspective view of the connecting device employed at the right of Figs. 9 and 10.
Fig. 13 is a sectional elevation on the line 13—13 of Fig. 1.
Figure 14:
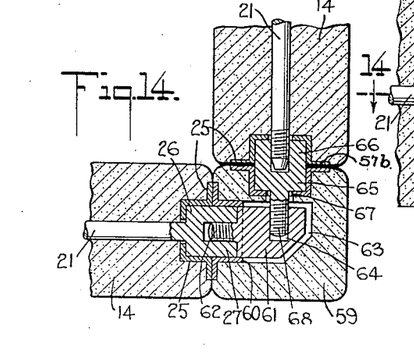
Fig. 14 is a sectional plan view on the line 14—14 of Fig. 13.

Referring to such Figs. 13 and 14, the upper partition panel 14 in Fig. 14 represents the free or loose end panel of the right hand partition shown in Fig. 1 and the lower left hand partition panel 14 in such Fig. 14 represents the right partition panel 14 of the partition that is to be connected to the right hand partition in Fig. 1. The left hand panel 14 in Fig. 4 is attached to its associated member to the left thereof by the usual tie rods 21 and as is usual, the non-cylindrical or multi-sided portion 27 of such tie rods 21 extends outward beyond the limits of the channel member 25 and such non-cylindrical or multi-sided portions 27 are in vertical alignment with each other.

A special end bar or block 59 of the same material as the partition panels 14 is employed having on two adjacent faces vertically arranged channel members 25. The channel member 25 on one of the faces of such special bar 59 is cut away on its innermost face, as indicated by the numeral 60, to allow the passage of a non-cylindrical or multi-sided block 61. The non-cylindrical or multi-sided portions 61 are each provided with an integrally threaded bolt portion 62 and by means of which they are rigidly secured to the threaded hole in the non-circular ends 27 of the tie rods 21 obviously before the non-cylindrical or multi-sided blocks 61 are forced through the opening 60 in the channel member 25. The bar 59 at the points adjacent the openings 60 in the channel member 25 may be cut away or the bar 59 may be specially arranged to have a vertically hollow passage 63 extending throughout its length. In either event, the cavity 63 forms a housing for the non-cylindrical or multi-sided blocks 61. The non-cylindrical or multi-sided blocks 61 are also drilled and tapped at right angles to the threaded bolt portion 62, as indicated at 64 and these threaded holes 64 are in alignment with the holes made for the tie rods 21 in the partition panels 14 forming the right hand partition shown in Fig. 1. To permit the free or loose partition panel 14 of the right hand partition shown in Fig. 1 to be secured to the bar 59, I provide special connecting members formed of the usual cylindrical portion 65, similar to the cylindrical portion 26 of the tie rods 21, and a non-cylindrical or multi-sided portion 66, similar to the non-cylindrical or multi-sided portions 27 of the tie rods 21, and also drill and tap the non-cylindrical or multi-sided portions 66 in the manner employed for the non-cylindrical or multi-sided portions 27 of such tie rods 21.

Also, the channel member 25 on this adjacent face of the bar 59 is drilled at points along its length as indicated at 67 to receive a threaded bolt portion 68 formed integral with the cylindrical portion 65 of the special block referred to and this special block is screwed into the threaded hole 64 in the non-circular portion 61. After the special blocks are in position as illustrated in Fig. 14, the free or loose partition panel 14 of the right hand partition shown in Fig. 1 is attached to the bar 59 by the tie rods 21 in the usual manner, after which the right hand partition shown in Fig. 1 is completed in the manner above described.

The channel members 25 preferably have the groove or channel therein filled with a sound and heat insulating and fire resisting material 57a. When the panel sections are assembled together, the excess of this material may flow outward between the sections, as is indicated by the reference character 57b.

With the special forms of connecters forming the subject matter of my present invention and by the method of assembly employed, I am able to take care of all ordinary and special cases of partition erecting whereby partitions may be attached to the outer walls of a building or to existing partitions in any combination desired and while I have necessarily shown the preferred forms of my invention and the methods by which they are employed somewhat in detail, it is to be understood that I may vary the shape, size and arrangement of such connecters and the methods of employing the same within relatively wide limits without departing from the spirit of the invention.

I claim:

1. An improved connecter for connecting partition panel sections together, comprising an elongated rod of a length sufficient to extend from edge to edge of a panel section, one end of such threaded rod being threaded and the head of such rod comprising a cylindrical portion and a multi-sided portion, said cylindrical and multi-sided portions being formed integral with each other and with the multi-sided portion at the remote end of the threaded rod, and a threaded perforation in the multi-sided portion in axial alignment with the threaded rod.

2. An improved connecter for connecting partition panel sections to a reenforced outer wall, comprising a U-shaped member having the free ends of its arms threaded, a slotted block member through which the threaded ends of the arms of the U-shaped member extend to thereby clasp between the U-shaped member and the slotted block a reenforce of the wall to which the partition is to be attached, and internally threaded block members threaded onto the threaded ends of the arms of the U-shaped member and a channel member clamped between the internally threaded blocks and the slotted block member.

3. An improved connecter for connecting the end of a partition panel to be erected to a riser of a building where such riser comprises a channel member or its equivalent, said connecter comprising an internally threaded block member having a cylindrical and a multi-sided portion and with a threaded extension formed integral with and extending outward from the multi-sided portion and in axial alignment with the internal threads in the block and a member cooperating with the threaded extension for clamping such block to a channel member.

4. An improved connecter for connecting the end of a partition composed of a plurality of partition panels to a panel at the joining edge of a pair of panel sections comprising a vertically arranged tapered slot in the abutting edges of the channel members formed in the abutting edges of the panel sections, a multi-sided block having an internally threaded perforation extending at right angles to the vertically tapered slot, a groove in such multi-sided block so positioned as to define a plate at the end of the multi-sided block remote from the threaded perforation therein, and a notch in said plate for engaging with the abutting edges of the flanges of the channel members to thereby lock the flanges together and the multi-sided block in position thereon.

5. In an improved connecter for connecting one end of a partition to a partition composed of a plurality of partition panels erected edge to edge, which comprises a right angle plate member provided with a perforation in one face through which may extend means for attaching the member to the threaded head of a partition panel connecting bolt and a perforation in the other face through which the threaded connecting bolt for a partition panel may extend.

6. An improved connecter for connecting a special panel member to the ends of adjoining panels which consists of a multi-sided body member provided at one end with integrally formed threaded member in combination with a connecting block for the partition panels provided with an internally threaded perforation extending inward at right angles to the integrally formed threaded member, said integrally formed threaded member being arranged to engage with the internally threaded perforation.

7. An improved connecter for connecting a partition panel to a partition panel at a point between its vertical edges which comprises a multi-sided block internally threaded at one end in the direction of its longitudinal axis, a hook member adapted to partially encircle a connecting bar extending transversely through a panel section from edge to edge, said hook member being provided with threads for association with the said internal threads and a threaded perforation in the opposite end of the multi-sided block for receiving the threaded end of a connecting bolt extending transversely through a panel section from end to end.

8. An improved building element comprising an outer wall having reinforcing means therein, a vertically arranged groove in said wall exposing said reinforcing means at a plurality of points along the length of the groove, a preformed partition panel member provided with a vertically arranged groove along one edge thereof, a plurality of multi-sided blocks attached to the reinforcing means at a plurality of points along the length of the groove in said wall, and means extending transversely through the partition panel member and engaging said multi-sided blocks, whereby said partition panel member is rigidly attached to said outer wall.

9. An improved building element comprising an outer wall having reinforcing means therein, a vertically arranged groove in said wall exposing said reinforcing means at a plurality of points along the length of the groove, a partition formed of a plurality of preformed panel members and with the end member provided with a vertically arranged groove along one edge thereof, a plurality of multi-sided blocks attached to the reinforcing means at a plurality of points along the length of the groove in said wall, and means extending transversely through the end member of the partition and engaging said multi-sided blocks, whereby said partition is rigidly attached to said outer wall.

10. An improved building element comprising an outer wall having reinforcing means therein, a vertically arranged groove in said wall exposing said reinforcing means at a plurality of points along the length of the groove, a partition formed of a plurality of preformed panel members and with the end member provided with a vertically arranged groove along one edge thereof, a plurality of multi-sided blocks attached to the reinforcing means at a plurality of points along the length of the groove in said wall, an internal thread formed in each of said multi-sided blocks and threaded rods extending transversely through said partition panel member and engaging said internal threads formed in the multi-sided blocks, whereby said partition is rigidly attached to said outer wall.

11. An improved building element comprising an outer wall having reinforcing means therein, a vertically arranged groove in said wall exposing said reinforcing means at a plurality of points along the length of the groove, U-shaped members having the free ends of its arms threaded, slotted block members through which the threaded ends of the U-shaped members extend, a channel member closing the vertically arranged groove and provided with perforations through which the threaded arms of the U-shaped members extend, and internally threaded blocks threaded onto the arms of the U-shaped member to clamp the channel member in position on the outer wall.

12. An improved building element comprising an outer wall having reinforcing means therein, a vertically arranged groove in said wall exposing said reinforcing means at a plurality of points along the length of the groove, U-shaped members having the free ends of its arms threaded, slotted block members through which the threaded ends of the U-shaped members extend, a channel member closing the vertically arranged groove and provided with perforations through which the threaded arms of the U-shaped members extend, and a plurality of internally threaded blocks spaced along the length of the channel to engage with the U-shaped members to clamp the channel member in position on the outer wall, each of said internally threaded blocks comprising a cylindrical portion and a multi-sided portion.

ROBERT L. DAVISON.